Aug. 9, 1960 W. A. KURAEFF 2,948,306
AIRCRAFT REFUELING SYSTEM
Filed Feb. 27, 1959 7 Sheets-Sheet 1

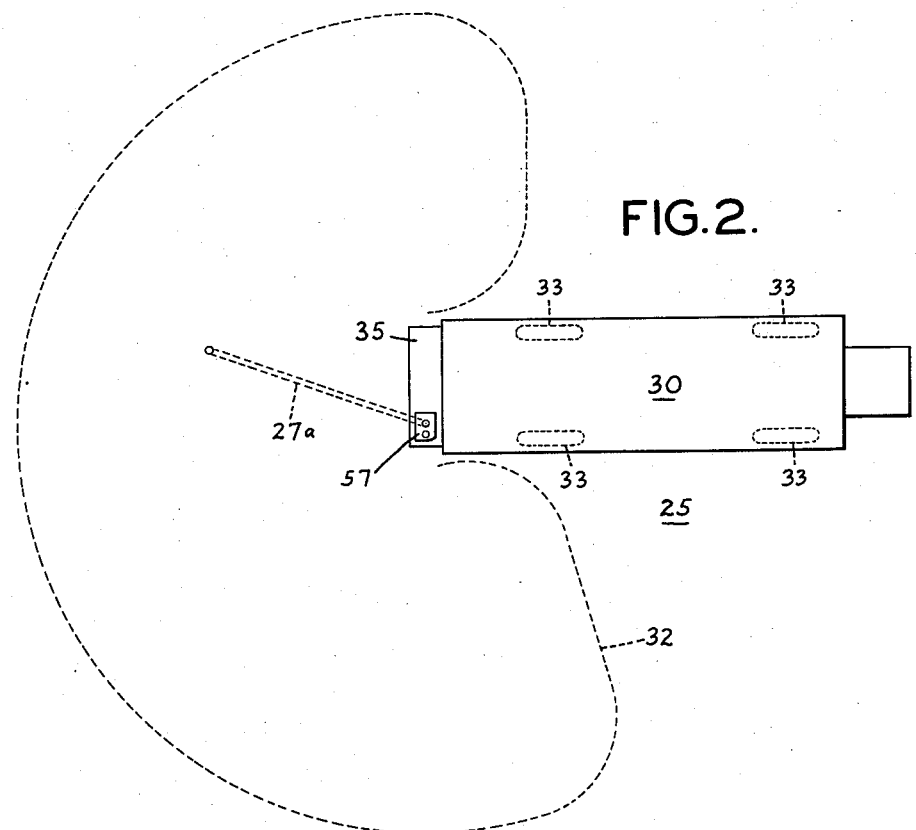
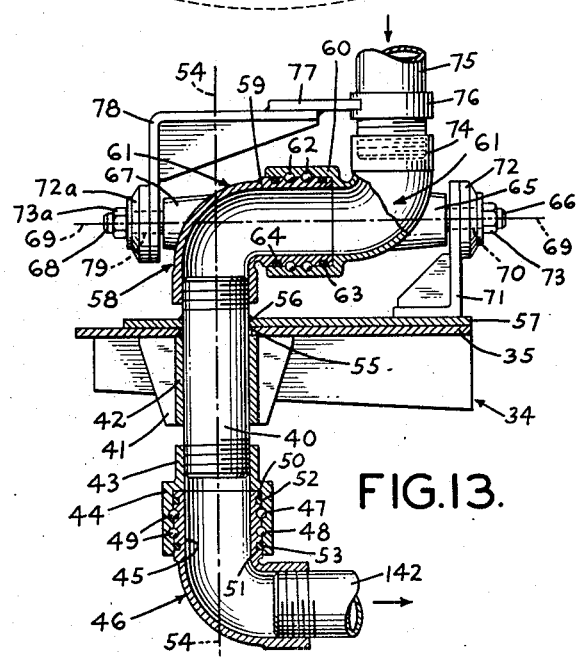

Aug. 9, 1960 W. A. KURAEFF 2,948,306
AIRCRAFT REFUELING SYSTEM
Filed Feb. 27, 1959 7 Sheets-Sheet 3

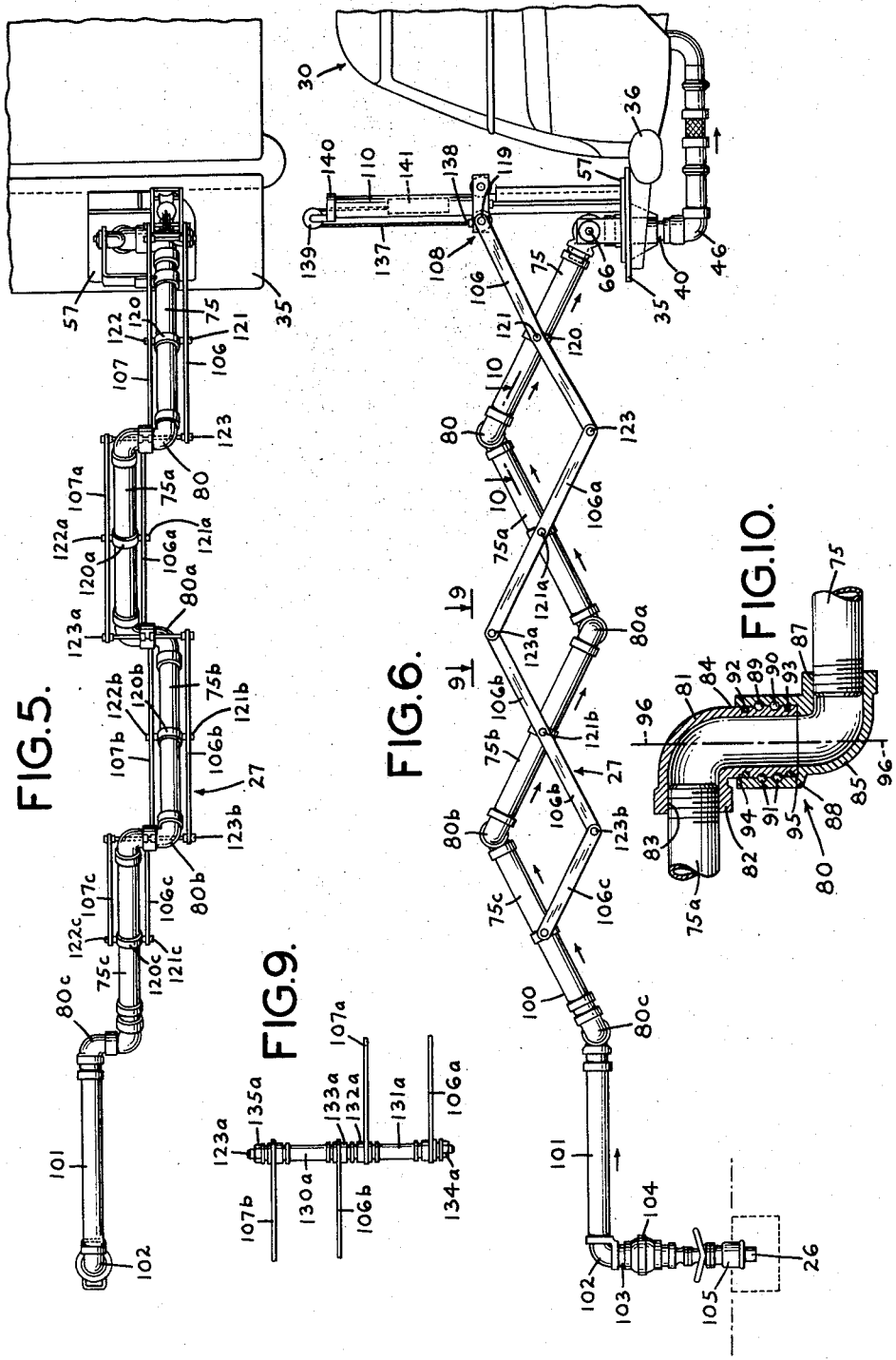

Aug. 9, 1960 W. A. KURAEFF 2,948,306
AIRCRAFT REFUELING SYSTEM
Filed Feb. 27, 1959 7 Sheets-Sheet 5

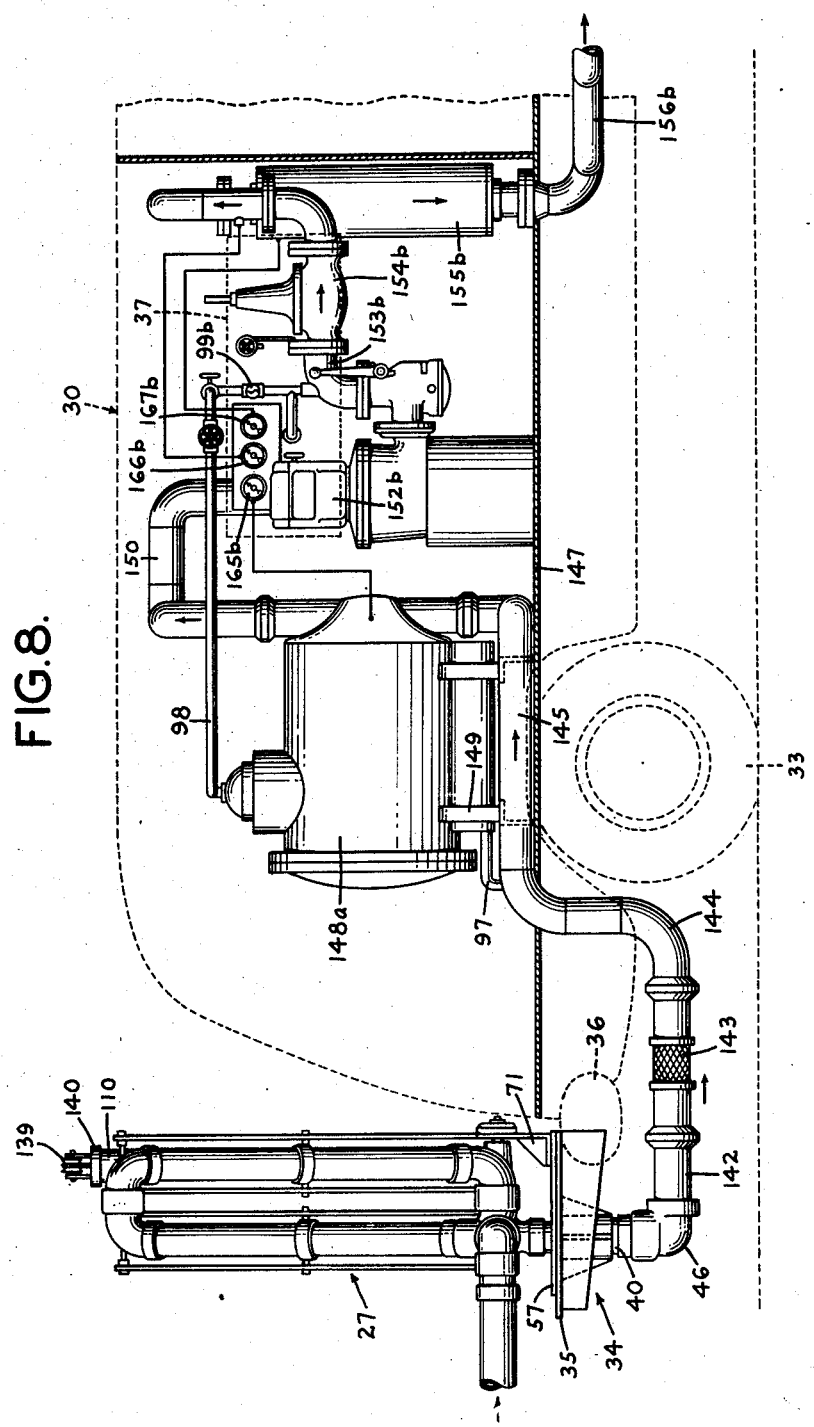

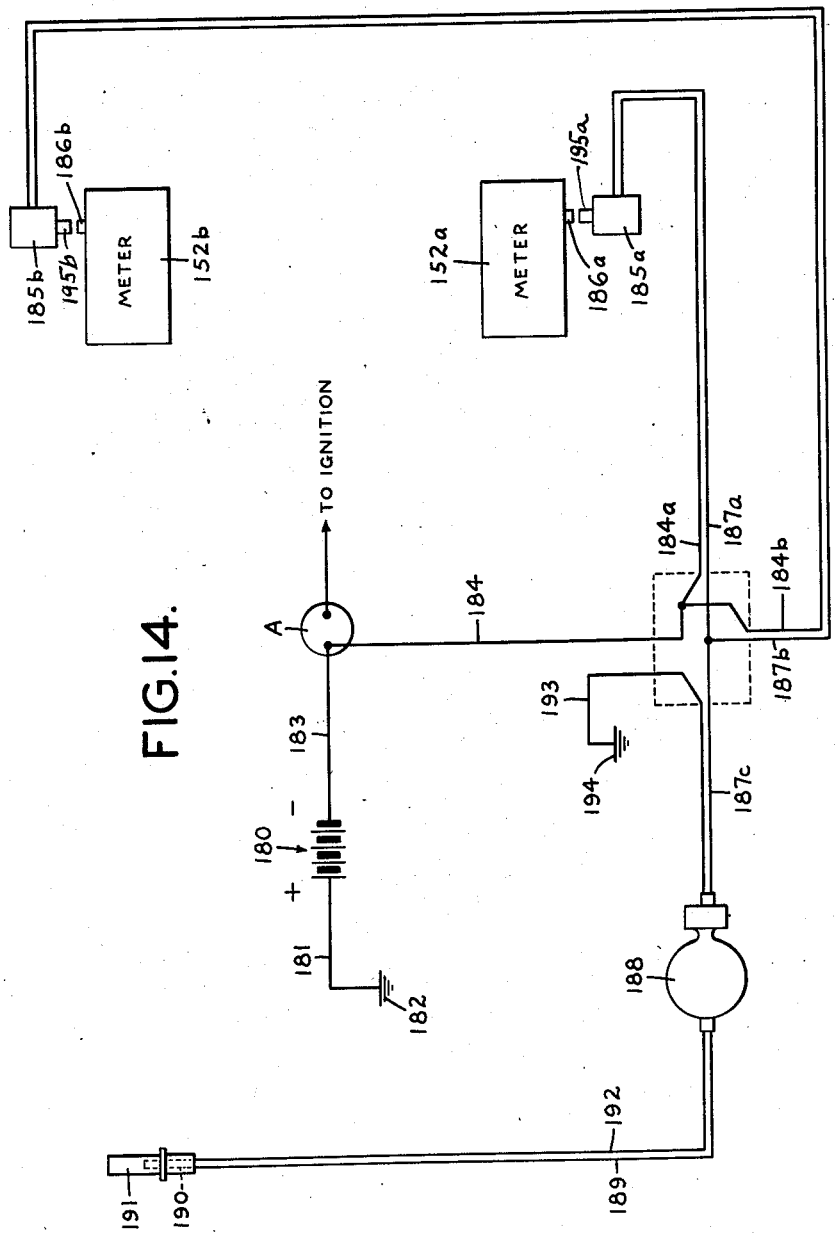

United States Patent Office 2,948,306
Patented Aug. 9, 1960

2,948,306

AIRCRAFT REFUELING SYSTEM

William Alexander Kuraeff, Bronx, N.Y., assignor to Standard-Vacuum Oil Company, White Plains, N.Y., a corporation of Delaware Filed Feb. 27, 1959, Ser. No. 796,089

14 Claims. (Cl. 141—231)

This invention relates to fueling systems and more particularly to a servicing system for refueling aircraft at an airport.

It is of course, common practice to charge gasoline into the fuel tanks of airplanes at airports. Often a plane has to be refueled in as short a time as possible. In some instances the planes may be supplied with gasoline directly from tank trucks which are moved into the vicinity of the location of the plane when it is parked at the airport. However, this is not always practical or permissible, so many of the important, or larger, airports are equiped with a system of storage tanks, transfer tanks and underground piping system which provides suitable outlets at convenient places for attachment of a servicer unit equipped with devices and conduits which are connectable to a nearby outlet or outlets in the airport fuel supply pipe system, and gasoline from the underground system is transferred through the servicer unit to the fuel tanks of the plane which is parked in the vicinity of the pipe outlets or hydrants; this vicinity being referred to in the parlance of airplane mechanics as a "bay." It will be understood that the airplane fuel is herein, for convenience, referred to as gasoline but this term is meant to include any liquid fuel that is intended for use as fuel for the power plant whether it be specifically referred to as gasoline or is identified by some other name.

In accordance with this invention a fueling system is provided wherein the piping of a gasoline storage tank and supply pipe installation at an airport is equipped with outlets or hydrants in the vicinity of the bay where airplanes are refueled. A maneuverable mobile servicer unit is provided with an inlet conduit for attachment to and detachment from the hydrants, the servicer unit preferably being equipped with filters, meters, gauges, etc. and an outlet conduit attachable to the fuel tank inlet connections for delivering gasoline to the tanks in the plane.

In the preferred construction, the servicer unit comprises an automotive truck chassis, suitably modified to accommodate the servicer components. This unit includes an extensible and contractible metal pipe conduit, in the form of a lazy tongs, the inner end of which is mounted on a suitable base on the truck; the outer free end of the conduit, by reason of the lazy tongs construction, being movable outwardly from the truck over a wide area for attachment to the hydrant of a gasoline supply line of the airport fuel storage and supply pipe system. For convenience of description, this extensible and contractible conduit which carries gasoline from the hydrant to the equipment on the truck, is herein referred to as an inlet conduit, to distinguish it from the conduit which carries fuel away from the equipment mounted on the truck, this latter conduit being herein referred to as an outlet conduit. The inner end of the inlet supply conduit is connected with an assembly of filters, meters, and other components mounted on the truck these being sometimes referred to collectively as a transmitter assembly. A flexible outlet conduit of desirable length to reach from the truck to the airplane fuel tank connections is connected at the discharge end of the truck components or transmitter assembly. The outer end of the outlet conduit may be attached to the plane fuel tank for delivery of gasoline to it. The outlet conduit is detachable from the plane tank for placing it on the truck. The inlet or "lazy tongs" conduit may be contracted from its extended position to compact form and stowed at the rear end of the truck and the outlet conduit may conveniently be stowed on the truck so that the servicer unit readily lends itself to being driven from place to place and is maneuverable to any desired fueling bay where it is desired to refuel a plane.

Although the novel features which are believed to be characteristic of the invention are pointed out in the annexed claims, the invention itself as to its objects and advantages and the maner in which it may be carried out may be better understood from the following more detailed description taken in connection with the accompanying drawings, forming a part hereof, in which—

Fig. 2 is a diagrammatical plan view of a fuel servicer truck, showing the scope of the lazy tongs conduit which is connectable to a hydrant in the airport fuel pipe system;

Fig. 5 is a plan view of the lazy tongs in fully extended position;

Fig. 6 is a side elevational view of the lazy tongs as shown in Fig. 5, connected to a typical hydrant;

Fig. 8 is a side elevational view of the inside of the truck, with the lazy tongues contracted or collapsed, the nozzle end extending rearwardly;

Fig. 9 is a plan view of a portion of the lazy tongs structure, this view being taken generally along line 9—9 of Fig. 6;

Fig. 10 is a sectional plan view taken generally along line 10—10 of Fig. 6, showing a typical swing joint of the lazy tongs conduit structure;

Fig. 13 is an elevational view partly in section, of the lazy tongs supporting structure, showing two swing joints in section, this view being taken generally along line 13—13 of Fig. 11;

Fig. 14 is a diagrammatic showing of a "dead man control" which is mounted in the system.

Figure 1:
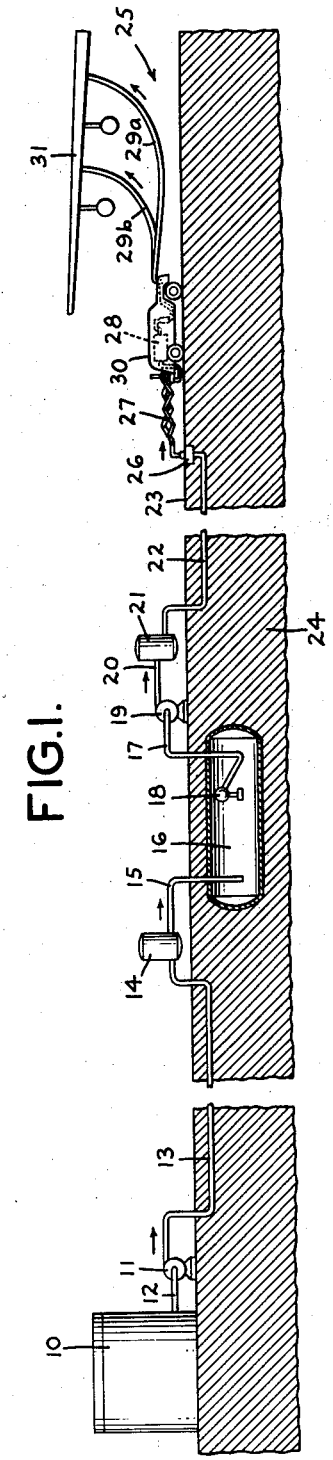
Fig. 1 is a sectional elevation showing in more or less diagrammatic fashion a fueling system in accordance with the invention.

Referring now to the drawings in which like reference characters indicate like parts throughout the several views, the fueling system at an airport (see Fig. 1) may comprise a storage tank 10 mounted above the surface of the ground for the storage of a relatively large quantity of gasoline or other liquid fuel (such liquid fuel being herein referred to merely as "gasoline," for convenience of description) of a grade used in the airplanes to be refueled at the airport. This storage tank may, in some instances, be located several miles from the airport. The gasoline in storage tank 10 may be pumped by a suitable pump 11 from the tank through lines 12, 13 through a filter 14, and line 15 into a temporary storage tank 16, which may be at or near the airport landing field itself. Or, gasoline may be transferred from a tank-truck, railroad tank car, or the like, to tank 16. Or, in some instances, such mobile tanks may serve as a temporary loading tank. A suction line 17 equipped with a floating intake 18, leads into a pump 19 which discharges through line 20, thence through filter 21 into the airport supply line 22 which is perferably under the surface 23 of the ground 24. The supply line 22 is located near the refueling bays 25 at the airport and have underground hydrants 26 (sometimes called valves), accessible from above ground for attachment thereto of the servicer unit 30, which has an extensible and contractible metal tube inlet, or lazy tongs, conduit 27, various other components 28, and outlet conduits 29a, 29b whose free ends are connectable to the fuel tanks in the wing 31 of an airplane to be refueled. It will be understood that the storage and supply line system may vary but in any event an outlet such as hydrant 26 is provided for connection of a fueling conduit or liquid transmitter arrangement to carry the gasoline from the hydrant to the fuel tanks in the plane.

Fig. 2 diagrammatically represents a refueling bay 25 of the airport with the servicer truck 30 located therein, the dotted lines 27a indicating the lazy tongs inlet conduit, partially extended, and the curved dotted line 32 indicating the scope of the area reached by the free end of the lazy tongs when in extended position.

The servicer unit, designated generally by reference numeral 30, as shown, comprises a movable vehicle, such as, for example, an automotive panel truck chassis, having wheels 33, steering wheel and apparatus and other equipment and accessories for driving the truck from place to place; the chassis being suitably modified for mounting the various components of the liquid transmitter system. A bracket 34, having a horizontally mounted foundation plate 35, is secured to a steel rear bumper 36, in turn secured to the truck frame. Each side panel of the truck is provided with a hinged side panel door 37 which is normally closed but is openable for access to the working components of the liquid transmitter equipment mounted inside the truck body.

Figure 4:
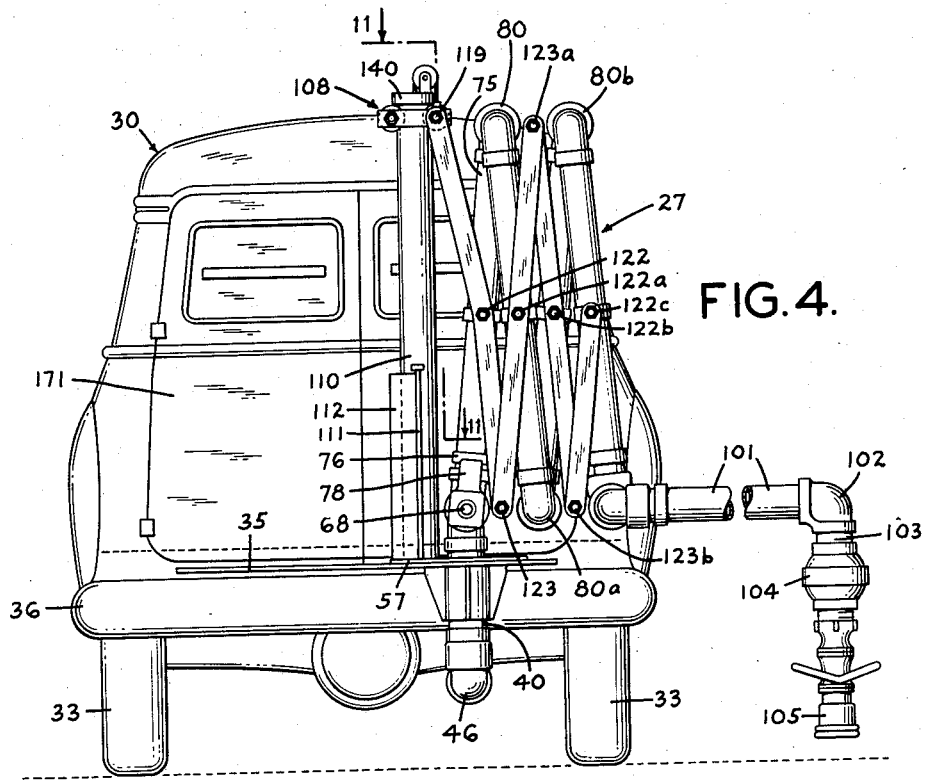
Fig. 4 is a rear elevational view of the servicer truck with the outer end section and nozzle in spaced relationship with the truck and directed downwardly.

The lazy tongs inlet conduit 27 comprises a plurality of tubular nipples connected together at their ends by suitable swing and elbow connections and suitably arranged and braced by operating arms in lazy tongs fashion for extension as shown in Figs. 5 and 6 or for contraction as shown in Figs. 4 and 8. The lazy tongs assembly comprises a vertically disposed pipe nipple 40, which is mounted for rotation in depending bracket 41 having a depending cylindrical nipple or bushing 42, serving as a bearing surface (see Fig. 13). The lower end of nipple 40 has a collar 43 threaded thereon. The collar 43 has a cylindrical extension 44 into which extends leg 45 of an elbow 46. Bearing races 47, 48 are provided, in which are mounted ball bearings 49. Grooves 50, 51 in the leg 45 have inserted therein O-rings 52, 53 of suitable resilient packing material to form a liquid-tight seal. It will now be seen that nipple 40 is rotatable on its axis which is the vertical axis 54 of the leg 45 of elbow 46.

The nipple 40 extends through an aperture 55 of foundation plate 35 and an aperture 56 of a base plate 57 which rests upon foundation plate 35. The nipple 40 is fixedly welded to the base plate 57. The engaging surfaces of foundation plate 35 and base or bed plate 57 are ground smooth to provide suitable bearing surfaces. The base plate 57 is rotatable on foundation plate 35 together with nipple 40 about the axis 54. Threaded upon the upper end of nipple 40 is an elbow 58 of similar construction as elbow 46 previously described. The horizontal male leg 59 of elbow 58 extends into the collar 60 of elbow 61. Races and ball bearings 62 are provided and O-rings 63, 64 make a liquid-tight seal. Elbow 61 has welded thereto an outwardly extending horizontally disposed boss 65 which provides a trunnion journal 66. Elbow 58 has a similar boss 67 providing a trunnion journal 68. The axes of these trunnions are coaxial and also coaxial with the axis 69 of the elbows 58, 61. The trunnion journal 69 extends through a bearing aperture 70 in an upstanding bracket 71 resting on and fixedly welded to base plate 57. A retaining washer 72 and nut 73 maintains the journal in the bearing. Threaded into the leg 74 of elbow 61 is a nipple 75 (herein for convenience of description referred to as an inner-end nipple). Welded to the nipple 75 is a collar 76 to which is secured a plate 77 which in turn support a bracket 78. This bracket 78 has a bearing aperture 79 through which extends trunnion jorunal 68. A retaining washer 72a and nut 73a maintain the trunnion in rotatable position. Now, it will be seen that the base plate 57 may be rotated on axis 54 and hence nipple 40 rotated on the same axis. And the nipple 75 may be moved in a plane at right angles to the horizontal axis 69 and swung axis 69. The trunnion and bracket arrangement provides adequate strength to maintain these parts in proper relationship to each other.

Threaded on to the upper end of inner-end nipple 75 is a swing joint 80. A typical swing joint is shown in Fig. 10 and will be described in connection with nipple 75. It will be noted that the swing joint 80 (see Fig. 10) comprises an elbow 81 having a leg 82 having a female threaded end 83 and a male leg 84; and an elbow 85 having a leg having a female threaded end 87 and a female leg 88. The male leg 84 extends into and is rotatable in female leg 88, it being noted that suitable ball bearing races 89, 90 are provided in which are mounted ball bearings 91. O-rings 92, 93 of resilient packing material in grooves 94, 95, provide a liquid-tight seal. Now it will be seen that the elbows may be rotated relative to each other about axis 96.

Threaded into the opposite side of swing joint 80 is an intermediate nipple 75a, similar to nipple 75 (see Figs. 5, 6), the lower end of nipple 75a being threaded into a similar swing joint 80a. A similar intermediate nipple 75b is connected to nipple 75a through swing joint 80a. A similar intermediate nipple 75c (herein for convenience of description referred to as the lazy tongs outer-end nipple) is connected to intermediate nipple 75b through a similar swing joint 80b. The outer end 100 of outer-end lazy tongs nipple 75c is connected to a similar swing joint 80c, the opposite end of which is connected to an end-extension nipple 101. As shown there are three angularly disposed intermediate nipples, 75a, b, c, but it will be understood that a greater or less number might be empolyed. The outer end of extension nipple 101 is screwed into an elbow 102, into which is screwed a nipple 103. Connected to nipple 103 is a swivel, ball joint 104, the outer end of swivel joint 104 being connected to hydrant valve 105, the valve 105 herein shown being of the so-called handle bar type. This hydrant valve 105 has as female threaded end which may be threaded onto the male hydrant outlet 26 which is connected to the supply line and which is ordinarily below ground but accessible for attachment of the hydrant valve 105.

Figure 11:
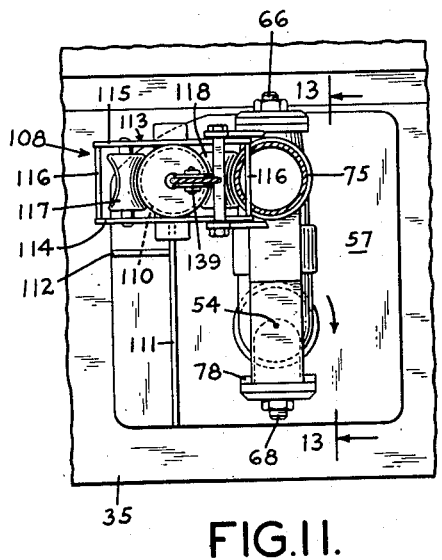
Fig. 11 is a partial plan view of the lazy tongs supporting structure in stowed position, this view being taken generally along line 11—11 of Fig. 4.
Figure 12:
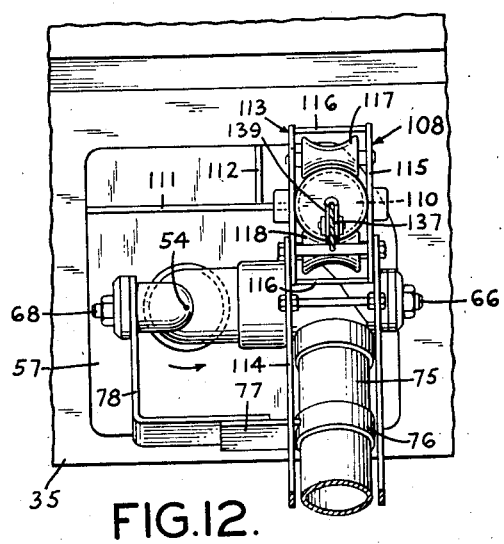
Fig. 12 is a view similar to that shown in Fig. 11, with the lazy tong structure having been rotated 90° clockwise, and extended rearwardly into use position.
Figure 7:
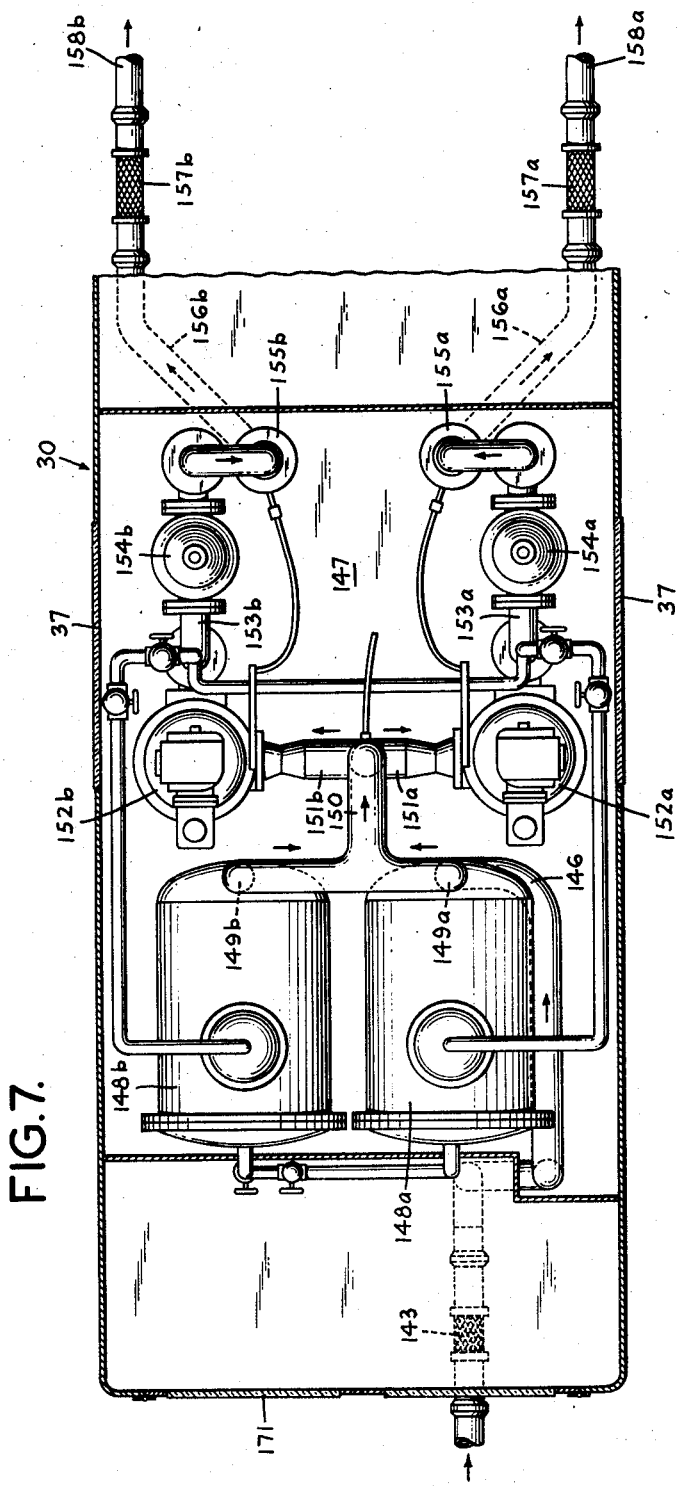
Fig. 7 is a plan view of the truck with the top removed, showing the equipment located therein.

As indicated above the nipples 75a, b, c, are arranged in lazy tongs fashion, hence suitable operating bar-arms 106a, b, c; 107a, b, c, are provided which are hingedly connected together and pivotally secured to the several nipples midway of their lengths. The inner ends of the innermost hinged operating arms 106, 107 are secured to a collar assembly 108 which is vertically slidable upon a vertically disposed post 110 fixedly disposed on base plate 57. The post 110 is hollow and secured, as by welding, at its lower end, to base plate 57 (see Figs. 4, 5, 6, 11, 12). Vertical plates 111, 112 welded to each other and to the post 110 maintain the post in rigid vertical position on the base plate 57 and serve as a limit stop to downward movement of collar assembly 108 on post 110. The collar assembly 108 comprises a roller frame 113, comprising parallel flat side rails 114, 115 secured in spaced relationship by cross members 116 (see Figs. 11, 12). A pair of oppositely disposed concave faced rollers 117, 118 mounted for rotation in the side rails, engage and roll on the cylindrical post 110. The roller assembly 108 is movable up and down on the post.

Each of a pair of operating bar-arms 106, 107 is pivotally connected to the roller assembly 108 by means of a pin 119 (see Figs. 5, 6), it being noted that bar 106 extends along one side of nipple 75 and bar 107 extends along the other side of this nipple. Bars 106 and 107, midway of their lengths, are pivotally secured to a collar 120, by means of oppositely extending pins 121, 122. The collar 120 is fixedly welded to nipple 75 midway of its length. The outer ends of bars 106, 107 are pivotally secured to a hinge pin 123 which lies crosswise, and below, and parallel with, the axis 96 of swing joint 80.

A similar pair of bar-arms 106a, 107a lying on opposite sides of nipple 75a are pivotally connected at their inner ends to hinge pin 123 and at their outer ends to a hinge pin 123a. These operating arms are pivotally connected midway of their lengths to oppositely extending pivot pins 121a, 122a which are secured to a collar 120a (similar to collar 120). Collar 120a is secured to nipple 75a midway of its length. Also pivotally mounted to the hinge pin 123a at their inner ends is a pair of similar intermediate operating bar-arms 106b, 107b pivotally mounted on pins 121b, 122b on collar 120b, secured to nipple 75b midway of its length.

Hinge pin 123a is typical of the other hinge pins and is perhaps best shown in Fig. 9. It will be seen that the hinge pin 123a is provided with spacer 130a which maintains arms 106b, 170b in spaced relation, and with spacer 131a which maintains arms 106a, 107a in spaced relation. Spacers 132a, 133a maintain arms 106b, 107a in spaced relation. And washers and nuts 134a, 135a retain the ends of the operating bar arms on the hinge pin.

The outer ends of operating bar-arms 106b, 107b are similarly mounted on hinge pin 123b. The outer-end operating bar-arms 106c, 107c are only half as long as the intermediate arms 106a, b and 107a, b. The inner ends of arms 106c, 107c are pivotally secured to hinge pin 123b at their inner ends and at their outer ends they are pivotally connected to pins 121c, 122c in turn secured to collar 120c fixedly secured to nipple 75c midway of its length.

The roller assembly 108 on post 110 has secured to it a counterbalance. This comprises a metal rope 137 secured at one end 138 to roller assembly 108 and trained over a rotatable sheave 139 and extending through a cap 140 downwardly into hollow post 110; the other end of rope 137 being attached to a vertically movable, cylindrically shaped counterbalancing weight 141.

Figure 3:
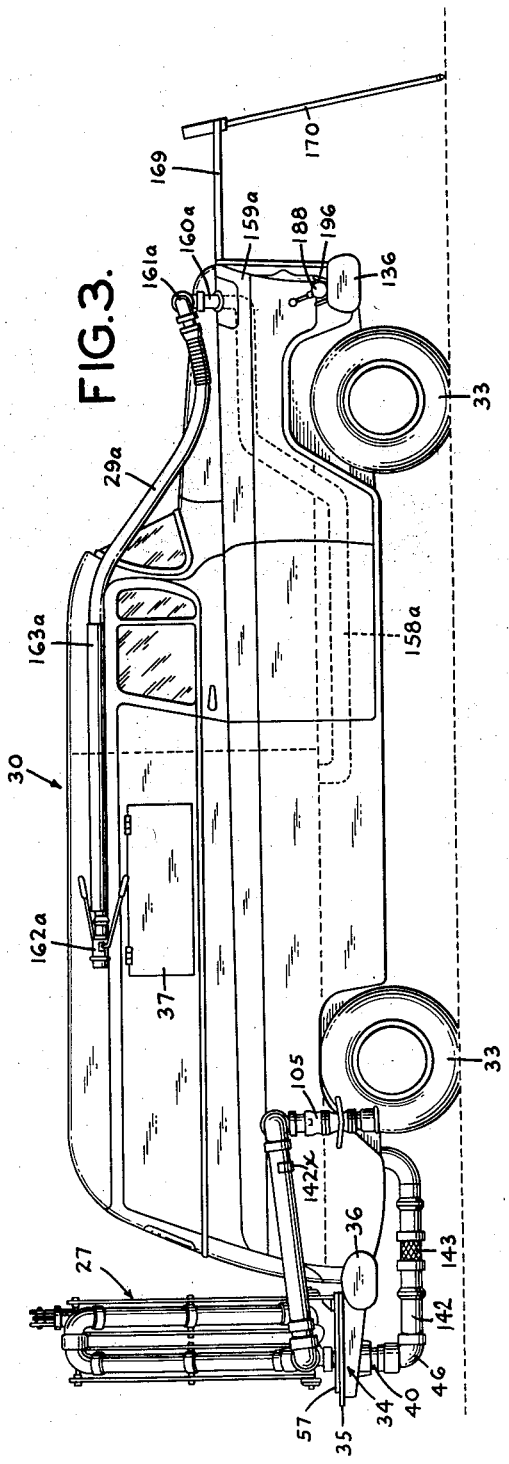
Fig. 3 is a side elevational view of the servicer truck with the lazy tongs in contracted and stowed position.

Now it will be seen that the inlet lazy tongs conduit 27 may be collapsed or contracted as shown in Figs. 3, 4 and the extension nipple may be turned to rest upon a bracket 142x (see Fig. 3) secured to the side of the truck 30. Or, the lazy tongs conduit 27 may be extended, as shown in Figs. 5, 6 and the connecting fitting 105 may be swung in any direction for manipulation for connecting it to a hydrant such as hydrant 26. And the connecting fitting 105 may be swung and maneuvered in any position within the scope of the area bounded by dotted line 32 (see Fig. 2). The counterweight 141, of course, tends to balance the forces when extending and contracting the lazy tongs conduit 27 and it has been found that pipe of four inch diameter and nipples of about four feet in length when constructed in lazy tongs fashion as illustrated make the arrangement such that it is readily handled and manipulated by one man.

Threaded into female leg of elbow 46 below the mounting bracket 34 is a nipple 142 (see Fig. 8) to which is connected a flexible conduit joint 143 which in turn is connected to an elbow 144 to which is connected a conduit 145 with suitable bends leading into an inlet header 146 of a pair of filter-separators 148a, 148b mounted on supports 149 on the floor 147 of the truck chassis. The header 146 is connected to suitable inlets into the filter-separators 148a, 148b and the outlets 149a, 149b of the filters are connected to outlet header 150 which in turn is connected to a branch conduit 151a and 151b. Branch 151a leads into a meter 152a in turn connected to conduit 153a in which is a pressure control and surge shut-off valve 154a. The conduit 153a leads into a desurger 155a which serves to absorb surges in pressure and irregularities in the stream of liquid fuel passing through the transmitter system. The desurger 155a is connected through a conduit 156a running under the floor of the truck to a flexible joint 157a which in turn is connected to a conduit 158a which runs under the right front fender 159a of the truck and terminates in an upstanding short nipple 160a above the fore end of the fender. Nipple 160a is connected through a swivel elbow connection 161a to the inner end of an elongate portion 29a of flexible hose suitable for transmitting gasoline or other liquid fuel. As shown this hose is of three inch diameter. The outer end of the hose 29a is equipped with a discharge fitting 162a of the handle-bar type. This fitting may be attached to the inlet connection to a fuel tank in the wing 31, as indicated in Fig. 1. The flexible outlet hose 29a may be stowed on a suitable bracket 163a on the roof of the truck when not in use.

The transmitter components on the left hand side of the truck are the same but "other hand" to the components of the right hand side. Branch pipe 151b is connected to these components which are the same as those on the right hand side and are designated by similar reference numerals with sub "b." The line 158b, of course, extends under the left front fender and the hose 29b is therefore mounted on the left hand side of the truck. The transmitter components are equipped with the usual drain pipes 97, vent pipes 98, sight glasses, etc. Also each side is equipped with a set of pressure gauges, as illustrated at 165b, 166b, 167b.

Mounted on the front end of the truck is a folding platform 169 having a hinged ladder 170 which may rest on the ground for ascending to the platform 169 for handling the hoses 29a and 29b. The ladder and platform may be folded down and out of the way when not in use. Access to the inside of the truck body or housing may be had through hinged rear door 171 and to the valves, gauges and controls through the hinged side panel doors 37 on each side of the truck.

The servicer may be operated as follows: Assuming a suitable supply of liquid fuel in tank 16 being pumped into supply line 22 under suitable pressure, the servicer truck 30 is driven into refueling bay 25 and maneuvered to a position in which the flexible hoses 29a, 29b will reach the inlet fittings of the fuel tanks of the plane and the lazy tongs conduit 27 may be extended ot reach a supply hydrant 26. The lazy tongs is extended and manipulated so that inlet valve 105 is connected to the supply hydrant. And the outlet nozzles 162a, 162b of hoses 29a, 29b are connected to the fuel tank inlet fittings. The various valves are opened and particularly valves 154a, 154b are set to regulate the pressure to desired reading. The fuel is then transmitted through the lazy tongs conduit 27, through the filter-separator, meter and desurger components in the truck and discharged through the outlet hoses 29a, 29b into the fuel tanks. The servicer unit, illustrated in the drawings is capable of delivery of as much as six hundred gallons per minute.

If desired the system may be equipped with a "dead man" control whereby to enhance the safety features of the servicer. This control is one that provides a device which when within the control of the operator the system is operative but if the device should not be held or controlled by the operator, either through accident or human failure, the arrangement is such that the pumping is automatically stopped. Such an arrangement is diagrammatically illustrated in Fig. 14. A twelve volt battery and ignition system for the truck provides electric power also for operation of the "dead man" control. The battery of the truck is indicated at 180 with wire 181 grounded at 182 through the truck frame. The negative side of battery 180 is connected through wire 183 through ammeter A through wire 184 and branch wire 184a to a solenoid 185a connected to operate a valve 186a which controls the operation of meter 152d shown in Fig. 14 in conventional fashion. The other side of solenoid 185a is connected through wire 187a through wire 187c through extension reel 188 through wire 189 to a mercury switch 190 mounted within a hollow tubular handle 191. The other side of the mercury switch 190 is connected to wire 192, through extension reel 188, through wire 193 and grounded to the chassis at 194. Hot wire 184 is also connected to wire 184b which is connected to one side of solenoid 185b and the other side of this solenoid is connected by wire 187b to wire 187c. The solenoid 185b is mounted to control the operation of meter valve 186b which controls the operation of meter 152b, shown in Fig. 14 in diagrammatic fashion.

The control handle 191 which mounts switch 190 is such that when the handle is held in vertical position contact is made through switch 190 so that current flows through solenoids 185a, 185b to maintain the solenoid control buttons 195a, 195b in a retracted position and liquid fuel will continue to flow through the hoses 29a, 29b. If, however, through accident or human failure, or otherwise, the operator ceases to hold the handle 191 in vertical position and it is dropped or tilted as by loss of control of it, contact through switch 190 is broken, and hence current will cease to flow through solenoids 185a, 185b which will cause the solenoid control buttons 195a, 195b automatically to stop flow of fuel through the system by extending and pushing the meter buttons 186a, 186b thereby closing the meter control valves. Preferably, the switch handle 191 and extension reel 188 is stowed near the front end of the truck when not in use, such as in a suitable bracket 196 on the front bumper 136 of the truck.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In a system for refueling airplanes or the like which comprises a supply line through which is pumped liquid fuel under pressure and an outlet hydrant connected to said supply line; a servicer unit which comprises an extensible and contractible inlet lazy tongs conduit comprising a plurality of pipe nipples joined at their ends to provide swing joints, said lazy tongs conduit, having an outer end connectable to and disconnectable from said hydrant and an inlet end, a transmitter assembly, said lazy tongs conduit inlet end being connected to said transmitter assembly, a movable conduit having an inlet end connected to said transmitter assembly and having an outer end, a fitting mounted on said outer end of said movable conduit connectable to and disconnectable from the inlet port of a fuel receiving tank, counterweight means connected to said lazy tongs to balance the forces when said lazy tongs is manually extended and contracted.

2. In a system for refueling airplanes which includes a supply line through which is pumped liquid fuel under pressure and an outlet hydrant connected to said supply line; a mobile servicer unit which comprises a frame, an extensible and contractible inlet lazy tongs unit including a pipe conduit having a plurality of pipe nipples connected by swing joints, said lazy tongs conduit having an inner end and an outer end, a fitting on said outer end connectable to and disconnectable from said hydrant, a transmitter assembly on said frame, said lazy tongs conduit inner end being connected to said transmitter assembly, a flexible conduit having an inner end connected to said transmitter assembly and having an outer end, a fitting mounted on said outer of said flexible conduit connectable to and disconnectable from the inlet fitting of the fuel tank of a plane to be refueled, a series of operating arms pivotally connected to each other at their ends and pivotally connected intermediate their ends to said nipples intermediate their ends, a post mounted on said frame, and means slidable up and down on said post connecting with one of said series of arms, and counterbalance means connected to said slidable means acting to balance the forces on said lazy tongs.

3. In a system for refueling airplanes which comprises a supply line through which is pumped liquid fuel under pressure and an outlet hydrant connected to said supply line; a mobile servicer unit which comprises an automatic truck chassis, means on said chassis including a bed plate for mounting a lazy tongs conduit, an extensible and contractible inlet lazy tongs conduit mounted on said mounting means, said lazy tongs conduit being constructed of a series of pipe nipples connected at their ends by swing joints, and having an outer end connectable to and disconnectable from said hydrant and an inner end, means mounted on said bed plate mounting the inner end of said lazy tongs conduit, and permitting said lazy tongs conduit to be swung in a horizontal plane about the inner end of said lazy tongs conduit, a transmitter assembly including a liquid fuel filter-separator, meter, and desurger in series and connected to said lazy tongs conduit, a flexible conduit having an inlet end connected to said transmitter assembly and having an outer end, a fitting mounted on said outer end of said flexible conduit connectable to and disconnectable from the inlet fitting of the fuel tank of a plane to be refueled, a post mounted on said bed plate to one side of the innermost nipple of said lazy tongs conduit, a series of operating arms pivotally connected to each other at their ends and pivotally connected to said pipe nipples intermediate their ends, means at the inner end of the innermost of said series of arms slidably connected to said post for movement in a vertical direction, downward movement of said slidable means causing said lazy tongs to extend outwardly from said post and upward movement of said slidable means causing said lazy tongs to contract toward said post.

4. In a system for refueling airplanes having a pipe line delivering liquid fuel under pressure and a hydrant, in a fueling bay, connected to said pipe line; a refueling servicer which comprises, a mobile chassis, a vertically disposed post mounted on said chassis, a lazy tongs conduit mounted and carried on said chassis and having an inner end and an outer end, said lazy tongs conduit being extensible for extending said outer end and connecting it to the hydrant when said chassis is positioned a substantial distance from said hydrant, transmitter apparatus mounted on said chassis to which said inner end of said lazy tongs conduit is connected, a flexible discharge conduit carried on said chassis and having an inner end connected to said transmitter apparatus and an outer end connectable to a charging port of the fuel tanks on an airplane being refueled in said bay, said lazy tongs conduit comprising a plurality of angularly disposed pipe nipples connected at their ends by elbows forming swing joints, a plurality of operative arms pivotally connected at their ends and pivotally connected intermediate their ends to said angularly disposed nipples, means on the outer end of the innermost one of said operating arms connecting said outer end of said one arm for vertical movement on said post, said lazy tongs conduit and connected operating arms being contractable and extensible and in contracted position being stowable on said chassis.

5. In a system for refueling airplanes having a pipe line delivering liquid fuel under pressure and a hydrant in a fueling bay connected to said pipe line; a refueling servicer which comprises, a mobile chassis, means on said chassis for mounting an extensible and contractible lazy tongs conduit, a lazy tongs conduit mounted and carried on said lazy tongs mounting means and having an inner end and an outer end, said lazy tongs conduit being extensible for extending said outer end and connecting said outer end to the hydrant when said chassis is positioned a substantial distance from said hydrant, transmitter apparatus mounted on said chassis comprising filtering and metering devices to which said inner end of said lazy tongs conduit is connected, a discharge conduit connected to said filtering and metering devices, a flexible discharge conduit carried on said chassis and having an inner end connected to said discharge conduit and an outer end connectable to a charging port of the fuel tanks on an airplane being refueled in said bay, said lazy tongs conduit being contractible to compact shape and in contracted position being stowable on said chassis and said flexible discharge conduit being stowable on said chassis when disconnected from the airplane tank charging port, and means on said chassis for maintaining said contracted lazy tongs in stowed compact position and means on said chassis for maintaining said discharge conduit in stowed position during movement of said mobile servicer from place to place.

6. A refueling servicer according to claim 5 in which said mobile chassis comprises an automotive truck having a frame, and said lazy tongs conduit mounting means comprises a foundation plate mounted on said frame, a bed plate mounted on said foundation plate, said bed plate and foundation plate being rotatable relatively to each other about a common vertical axis, said lazy tongs conduit having a vertically mounted nipple at its inner end extending through said plates and mounted concentrically about said vertical axis, a vertical post mounted on said bed plate and fixed thereto at its lower end and movable with said bed plate, a roller assembly mounted for vertical movement on said post and operating arms connected to said assembly and lazy tongs conduit.

7. A refueling servicer according to claim 5 in which said transmitter devices comprises a filter tank, a measuring meter, and a desurger, in series.

8. A refueling servicer according to claim 6 in which said transmitter apparatus comprises a filter tank, a liquid measuring meter and a desurger mounted in series and said chassis has mounted thereon an automotive engine for driving said servicer from place to place under its own power.

9. A refueling servicer according to claim 5 in which said transmitter apparatus mounted on said chassis comprises a right hand and a left hand assembly, each of which assemblies comprises a filter tank, liquid meter, and desurger connected in series and a flexible discharge hose connected to said right hand assembly and a flexible discharge hose connected to said left hand assembly.

10. In a refueling system for refueling airplanes and the like which includes a supply line through which is pumped liquid fuel from a source of supply, a servicer unit which comprises a mobile truck having a frame, transmitter devices on said frame, and discharge conduits connected to said devices, and a lazy tongs unit, which comprises a foundation plate mounted on said frame, a bed plate mounted for rotation on said foundation plate, a plurality of angularly disposed pipe nipples connected by swing joints having horizontal axes to form a lazy tongs conduit having an outer end connectable to said supply line and an inner end connected to said transmitter devices, an inner vertically disposed nipple at the inner end of said lazy tongs extending through registering holes in said plates and rotatable about a vertical axis through said registering holes and permitting said lazy tongs conduit to be swung around said vertical axis in a horizontal plane, and said swing joints permitting said lazy tongs conduit to be extended from said vertical axis and to be contracted toward said vertical axis.

11. A fuel servicer system according to claim 10 in which said plurality of angularly disposed pipe nipples are connected at their ends by elbows forming swing joints to form a lazy tongs conduit, operating arms pivotally connected at their ends and pivotally connected midway of their length to said angularly disposed nipples, a post vertically mounted on said bed plate and fixed thereto at its lower end and positioned with its vertical longitudinal axis at a place outside said vertically disposed nipple at the inner end of said lazy tongs conduit, a roller assembly mounted on said post for vertical movement connected to the inner end of the inner operating arms.

12. A fuel servicer according to claim 11 in which said post is hollow, a counterweight vertically movable in said hollow post, and a flexible cable connected at its inner end to said weight and at its outer end to said roller assembly, said counterweight arrangement facilitating the manual extension and contraction of said lazy tongs conduit.

13. Apparatus according to claim 12 in which is connected an electrically operated dead man device operative upon loss of control of said device to prevent operation of said transmitter assembly.

14. Apparatus according to claim 12 in which is connected an electrical circuit including a switch to provide a dead man control, said switch being operative to disrupt current flow through said circuit upon accidental loss of manual control of said switch thereby to prevent further operation of said transmitter assembly.

References Cited in the file of this patent

UNITED STATES PATENTS

| | | |
|---|---|---|
| 1,680,831 | White | Aug. 14, 1928 |
| 2,525,074 | Knight | Oct. 10, 1950 |